(12) United States Patent
Olesen

(10) Patent No.: US 10,487,800 B2
(45) Date of Patent: Nov. 26, 2019

(54) WIND TURBINES

(71) Applicant: VESTAS WIND SYSTEMS A/S, Aarhus N (DK)

(72) Inventor: Ib Svend Olesen, Randers (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 32 days.

(21) Appl. No.: 15/536,084

(22) PCT Filed: Dec. 16, 2015

(86) PCT No.: PCT/DK2015/050399
§ 371 (c)(1),
(2) Date: Jun. 14, 2017

(87) PCT Pub. No.: WO2016/095926
PCT Pub. Date: Jun. 23, 2016

(65) Prior Publication Data
US 2019/0085822 A1 Mar. 21, 2019

(30) Foreign Application Priority Data

Dec. 17, 2014 (DK) .................. 2014 70792

(51) Int. Cl.
*F03D 7/02* (2006.01)
*F03D 1/06* (2006.01)
(Continued)

(52) U.S. Cl.
CPC ......... *F03D 7/0224* (2013.01); *F03D 1/0633* (2013.01); *F03D 17/00* (2016.05);
(Continued)

(58) Field of Classification Search
CPC ...... F03D 1/0633; F03D 7/0224; F03D 17/00; G01D 5/34; F05B 2240/30; F05B 2260/74; Y02E 10/721; Y02E 10/723
See application file for complete search history.

(56) References Cited

U.S. PATENT DOCUMENTS

| | | | |
|---|---|---|---|
| 2006/0051207 A1* | 3/2006 | Becerra | .................. F03D 1/065 416/5 |
| 2010/0021298 A1* | 1/2010 | Sandvad | ................. F03D 7/047 416/1 |

(Continued)

FOREIGN PATENT DOCUMENTS

| | | |
|---|---|---|
| CN | 101718799 A | 6/2010 |
| WO | 2008119354 A2 | 10/2008 |

(Continued)

OTHER PUBLICATIONS

Chinese Office Action for Application No. 201580069188.8 dated Aug. 2, 2018.

(Continued)

*Primary Examiner* — Igor Kershteyn
(74) *Attorney, Agent, or Firm* — Patterson + Sheridan, LLP

(57) ABSTRACT

A method of determining a twist angle of a wind turbine blade, the method comprising providing first and second transmitters on the wind turbine blade, the first transmitter being spaced apart from a receiver by a first distance, and the second transmitter being spaced 5 apart from the receiver by a second distance, the transmitters being arranged such that twisting of the blade causes an increase in one of the first or second distances and a decrease in the other of the first or second distances; transmitting a blinking signal from each of the first and second transmitters towards the receiver, the blinking signals having a blinking frequency; varying the blinking frequency of the blinking signals; monitoring the (Continued)

10 amplitude of the blinking signal received by the receiver as the blinking frequency is varied; determining a particular blinking frequency that results in an increased amplitude of the blinking signal received by the receiver; and using the determined particular blinking frequency to calculate the blade twist angle.

15 Claims, 9 Drawing Sheets

(51) Int. Cl.
    *F03D 17/00* (2016.01)
    *G01D 5/34* (2006.01)

(52) U.S. Cl.
    CPC ............ *G01D 5/34* (2013.01); *F05B 2240/30* (2013.01); *F05B 2260/74* (2013.01); *Y02E 10/721* (2013.01); *Y02E 10/723* (2013.01)

(56) References Cited

U.S. PATENT DOCUMENTS

| | | | | |
|---|---|---|---|---|
| 2012/0229792 A1* | 9/2012 | Fuglsang | ............. | F03D 7/0224 356/28 |
| 2013/0307961 A1* | 11/2013 | Puigcorbe Punzano | ..................... | F03D 17/00 348/82 |
| 2014/0054894 A1* | 2/2014 | Olesen | ..................... | G01H 9/00 290/44 |
| 2014/0286776 A1* | 9/2014 | Gao | ....................... | F03D 7/0224 416/155 |
| 2015/0085297 A1* | 3/2015 | Hughes | .................. | G01S 17/42 356/482 |
| 2015/0240787 A1* | 8/2015 | Byskov | .................. | F03D 17/00 416/1 |
| 2015/0322925 A1* | 11/2015 | Klitgaard | ................ | F03D 17/00 416/1 |
| 2016/0131111 A1* | 5/2016 | Olesen | .................. | F03D 7/0228 416/1 |

FOREIGN PATENT DOCUMENTS

| | | |
|---|---|---|
| WO | 2014187463 A1 | 11/2014 |
| WO | 2015070870 A1 | 5/2015 |
| WO | 20015065873 A2 | 5/2015 |

OTHER PUBLICATIONS

International Search Report for PCT/DK2015/050399, dated Mar. 15, 2016.
Danish Search Report for PA 2014 70792, dated Jun. 30, 2015.

* cited by examiner

WIND TURBINES

FIELD OF THE INVENTION

The present invention relates generally to wind turbines and more specifically to a method and system for determining the degree of twisting of a wind turbine blade during use of the wind turbine.

BACKGROUND

Modern utility-scale wind turbines have rotors comprising very long, slender blades. FIG. 1 shows a typical wind turbine blade 10, which tapers longitudinally from a relatively wide root end 12 towards a relatively narrow tip end 14. A longitudinal axis L of the blade 10 is also shown in FIG. 1. The root end 12 of the blade is circular in cross section. Outboard from the root, the blade has an aerofoil profile 16 in cross section.

The root of the blade is typically connected to a hub of the rotor via a pitch mechanism, which turns the blade about the longitudinal pitch axis L in order to vary the pitch of the blade. Varying the pitch of a blade varies its angle of attack with respect to the wind. This is used to control the energy capture of the blade, and hence to control the rotor speed so that it remains within operating limits as the wind speed changes. In low to moderate winds it is particularly important to control the pitch of the blades in order to maximise the energy capture of the blades and to maximise the productivity of the wind turbine.

The energy capture of a wind turbine blade generally increases moving from the root towards the tip. Hence, the inboard or root part 12 of the blade 10 tends to capture the least energy, whilst the outboard or tip part 14 of the blade tends to capture the most energy. Precise control over the pitch angle of the outboard part of the blade is therefore desirable in order to maximise the output of the wind turbine.

Modern wind turbine blades are typically 50-80 meters in length, and there is a constant drive to develop longer blades to capture more energy from the wind. These blades are generally made from composite materials such as glass-fibre reinforced plastic (GFRP). The blades are therefore relatively flexible and inevitably bend and twist to an extent during operation. The relatively narrow outboard part of the blade is particularly susceptible to twisting and bending.

Whilst the pitch mechanism allows precise control over the angle of the root of the blade, this does not necessarily reflect the angle of the tip of the blade, which is more susceptible to bending and twisting as mentioned above. The present invention provides a method and apparatus for measuring a twist angle of the blade tip accurately so that this information can be employed in control strategies. For example, accurate measurements of the twist angle can be employed in pitch control strategies allowing precise control over the angle of attack of the outboard part of the blade so that the energy capture of the blade can be maximised. The measurements may also be employed in blade load calculations and control strategies for protecting the blades from extreme loads.

The twist angle of the blade is defined herein as the angle between the chord line of the blade at the tip and a reference axis in a plane substantially perpendicular to the longitudinal axis L of the blade, as will now be described by way of example with reference to FIGS. 2a and 2b. The chord line is the straight line D connecting the leading edge 18 of the blade 10 to the trailing edge 20.

FIGS. 2a and 2b illustrate a cross-section of the tip of the wind turbine blade 10 in a plane substantially perpendicular to the longitudinal axis L and taken along the line A-A in FIG. 1. In FIG. 2a the blade 10 has a first twist angle, whilst in FIG. 2b the blade 10 has a second twist angle. The twist angle is marked $\theta$ in FIGS. 2a and 2b. The longitudinal axis L is substantially perpendicular to the plane of the page in FIGS. 2a and 2b.

The L-y plane defines the plane of rotation of the rotor, and the x-axis is perpendicular to this plane. The direction of rotation of the rotor about a rotor axis is indicated by R in FIGS. 2a and 2b, which traces a circle in the L-y plane when the rotor is turned through an angle of $2\pi$ radians. The wind direction is indicated as W in FIGS. 2a and 2b. In FIGS. 2a and 2b the wind direction is illustrated as being perpendicular to the L-y plane, although in practice the direction of the wind relative to the L-y plane varies, and may be incident at different angles.

In FIG. 2a the blade tip twist angle 9 is defined as 0 radians, that is, when the chord line D is parallel to the x-axis and therefore perpendicular to the L-y plane. FIG. 2b illustrates the blade tip turned through an angle $\theta$ with respect to the x-axis such that $\theta>0$.

In the subsequent discussion of the invention, the above definition of the blade twist angle will be applied. In other words, the blade twist angle $\theta$ is defined with respect to an axis (the x-axis of FIGS. 2a and 2b) formed perpendicular to the plane of rotation (the L-y plane of FIGS. 2a and 2b) of the blade. It will be appreciated, however, that the twist angle may be defined relative to another arbitrary reference, and so this definition should not be accepted as unduly limiting to the scope of the present invention.

Modern wind turbines are very tall structures, and the blades are particularly susceptible to lightning strikes. Therefore, most wind turbine blades incorporate lightning protection systems for conducting the electrical energy from lightning strikes safely to ground. The present invention aims to avoid the use of metal parts or electrical components on wind turbine blades as these can attract lightning strikes in preference to the lightning receptors on the blade, which may cause damage to the blade. Present systems for measuring the degree of blade tip twisting are highly expensive and fragile. In contrast, the present system and method is both simple and inexpensive to implement, and is resistant to damage caused by the extreme weather conditions to which wind turbines are commonly subject.

SUMMARY OF THE INVENTION

According to one aspect of the present invention there is provided a method of determining a twist angle of a wind turbine blade, the method comprising providing first and second transmitters on the wind turbine blade, the first transmitter being spaced apart from a receiver by a first distance, and the second transmitter being spaced apart from the receiver by a second distance, the transmitters being arranged such that twisting of the blade causes an increase in one of the first or second distances and a decrease in the other of the first or second distances. The method also comprises transmitting a blinking signal from each of the first and second transmitters towards the receiver, the blinking signals having a blinking frequency and varying the blinking frequency of the blinking signals. In addition, the method comprises monitoring the amplitude of the blinking signal received by the receiver as the blinking frequency is varied, determining a particular blinking frequency that results in an increased amplitude of the blinking signal received by the receiver, and using the determined particular blinking frequency to calculate the blade twist angle.

This method advantageously may be implemented without the need for expensive and/or fragile components. Specifically, there are no electrical parts needed in the wind turbine blade and the hardware used is robust, simple to arrange and cheap.

The first and second transmitters may be mutually spaced apart in a chordwise direction of the wind turbine blade. In addition, or alternatively, the first transmitter may be located at or near a leading edge of the wind turbine blade and the second transmitter may located at or near a trailing edge of the wind turbine blade. The edges of the blade are subject to a greater amount of relative movement caused by twist and so spacing the first and second transmitters at opposite edges gives a more accurate indication of the degree of blade twisting.

The first and second transmitters may be located near the tip of the wind turbine blade. The transmitters may advantageously be located near the blade tip since it is this part of the blade that is likely to be subject to the most severe bending.

In some embodiments the method comprises calculating the difference between the first distance and the second distance using the determined particular blinking frequency and calculating the blade twist angle using the calculated difference between the first distance and the second distance. The blinking signals from the first and second transmitters may be transmitted substantially simultaneously. This allows the difference between the first and second distances to be calculated more easily.

The amplitudes of the blinking signals from the first and second transmitters may be substantially identical. Transmitting the blinking signals at the particular frequency may result in the amplitude of the received signal at the receiver being approximately twice the amplitude of the transmitted blinking signals. This makes determining the value of the particular frequency simpler.

The receiver may be provided on a second blade of the wind turbine. This gives a constant point of reference for the first and second transmitters. The receiver may additionally be located near the tip of the second wind turbine blade.

In some embodiments there is provided a plurality of first transmitters and a plurality of second transmitters on the wind turbine blade. In such embodiments the first transmitters are mutually spaced along the length of at least part of the wind turbine blade and the second transmitters are mutually spaced along the length of at least part of the wind turbine blade. In addition, or alternatively, the method may comprise providing a plurality of receivers on the second wind turbine blade, the receivers being mutually spaced along the length of at least part of the second wind turbine blade. This allows the twisting of different parts of the blade to be determined, and also the overall twisting of the blade to be approximated.

The method may comprise communicating blinking signals from a remotely-located source to the first and second transmitters via a first optical fibre extending longitudinally along the wind turbine blade, and communicating the received blinking signals to a remotely-located detector via a second optical fibre extending longitudinally along the wind turbine blade. This advantageously obviates the need for electrical components on the blade and instead provides a method that may be implemented with hardware that is lightning insensitive.

According to another aspect of the present invention there is provided a system for determining a blade twist angle of a wind turbine blade, the system comprising first and second transmitters on the wind turbine blade each configured to transmit a blinking signal having a blinking frequency, a receiver configured to receive the blinking signals, and a controller configured to vary the blinking frequency of the blinking signals. The system further comprises a processor configured to monitor an amplitude of the blinking signal received by the receiver as the blinking frequency is varied, to determine a particular blinking frequency that results in an increased amplitude of the blinking signal received by the receiver, and to calculate the blade twist angle using the determined particular blinking frequency. The first transmitter is spaced apart from the receiver by a first distance and the second transmitter is spaced apart from the receiver by a second distance, and the transmitters are arranged such that twisting of the blade causes an increase in one of the first or second distances and a decrease in the other of the first or second distances.

The receiver may be located on a second wind turbine blade.

One or more of the transmitters and/or receivers may be safety rated. The processor may be safety-rated or the system may comprise a separate safety-rated processor. The system may also comprise a safety controller configured to override other control systems of the wind turbine in the event that the calculated degree of blade twisting is likely to cause safety issues with the operation of the wind turbine. Such an override may comprise the safety controller controlling the blade pitch such that unsafe operation of the blade is prevented.

The system may also implement a degree of self-checking to ensure that it is operating correctly. For example, when the system is operational, then the receivers expect to receive signals from the transmitters at certain intervals. If the signals are not received as expected, then the system may deem that the wind turbine blade is not operating safely and the safety controller may take appropriate action.

According to yet another aspect of the present invention there is provided a wind turbine comprising either of the systems disclosed above.

BRIEF DESCRIPTION OF THE DRAWINGS

FIGS. 1, 2a and 2b have already been described by way of background to the present invention in which:

FIG. 1 is a perspective illustration of an exemplary wind turbine blade having a circular cross-section at the root, and an aerofoil cross-section profile outboard from the root; and FIG. 2a is a schematic illustration of the cross-section of the tip of the blade of FIG. 1 having a blade twist angle of 0 radians, whilst FIG. 2b illustrates a blade twist angle of θ>0 radians.

Figure 3:
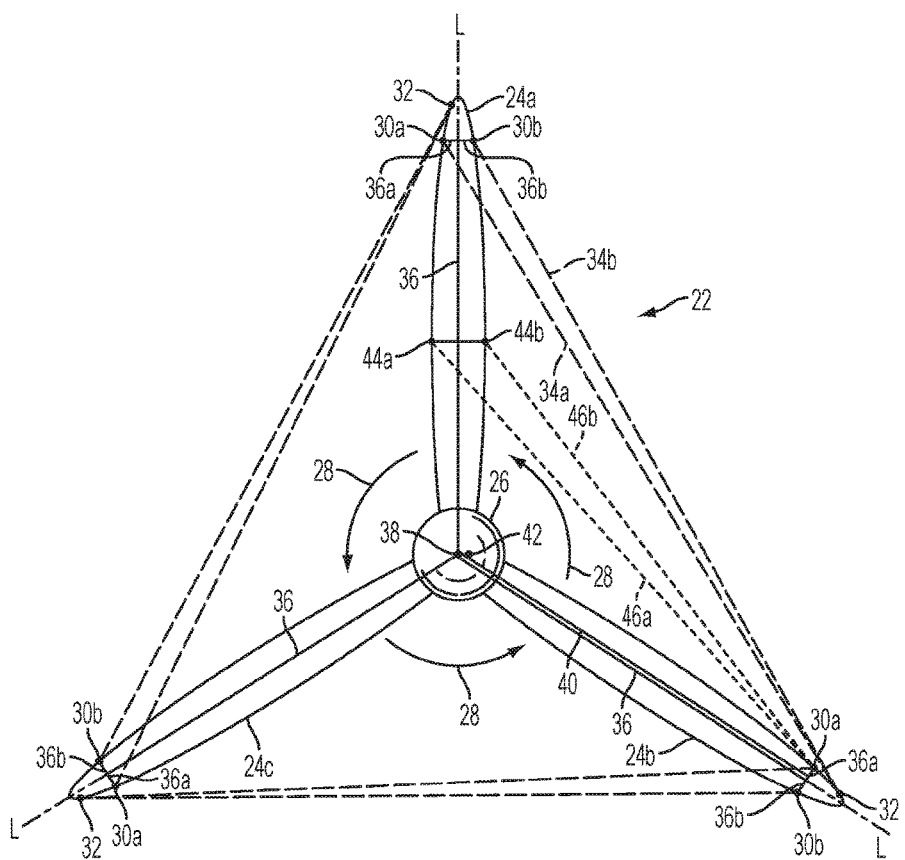
Figure 4:
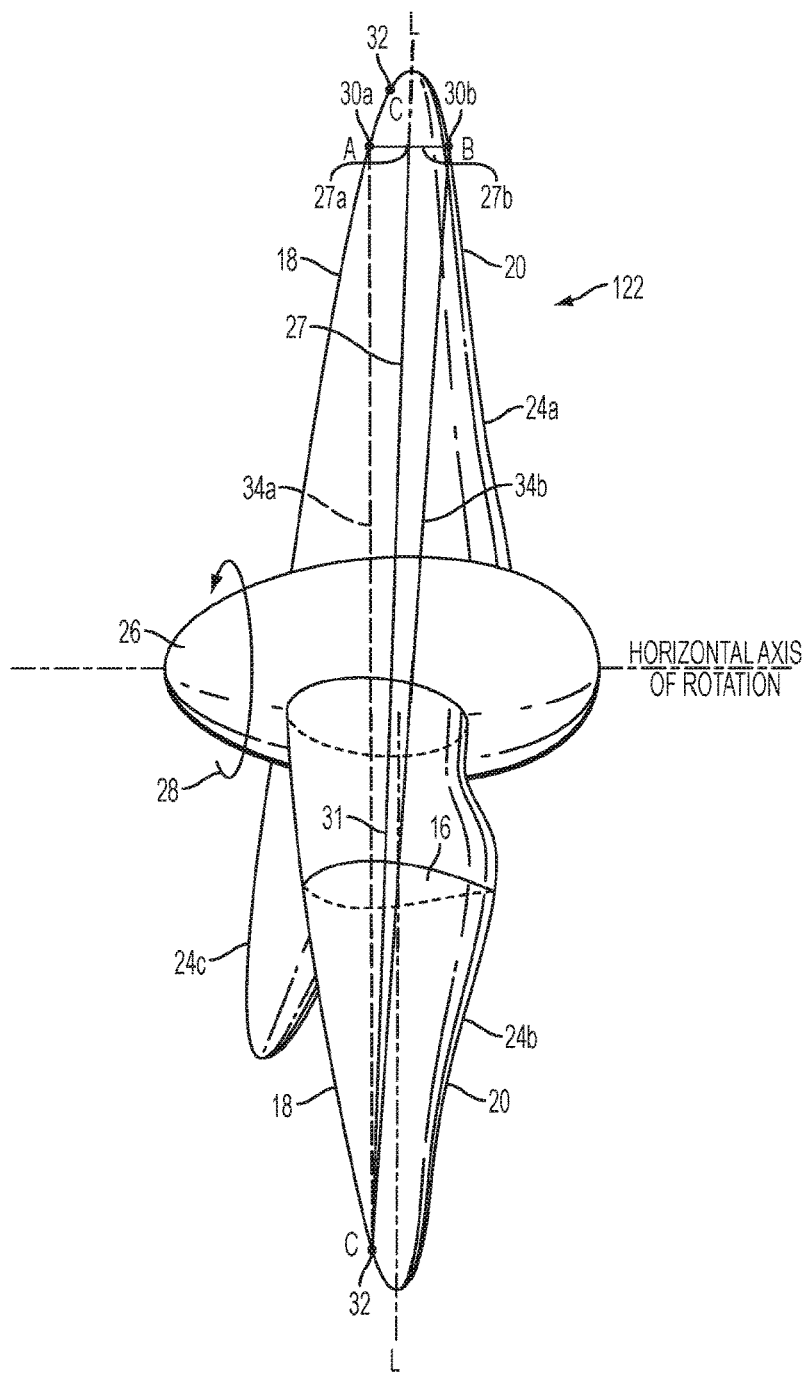
Figure 5A:
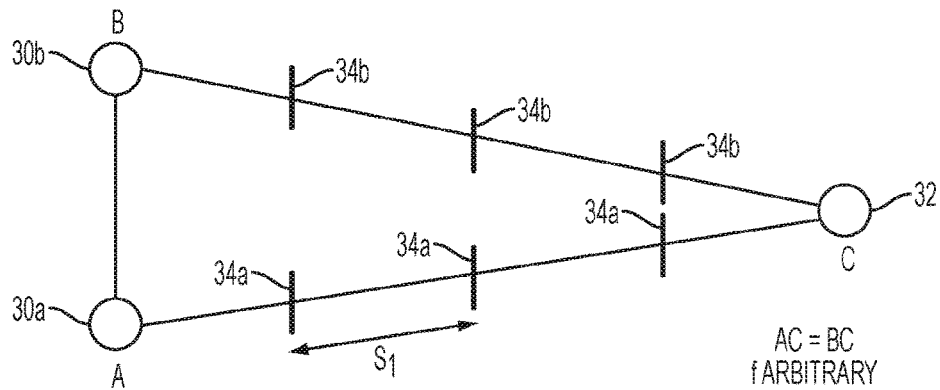
Figure 5B:
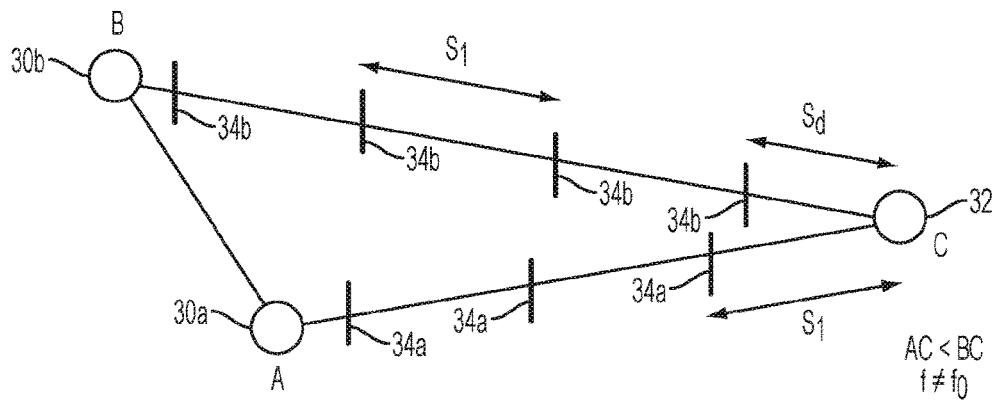
Figure 5C:
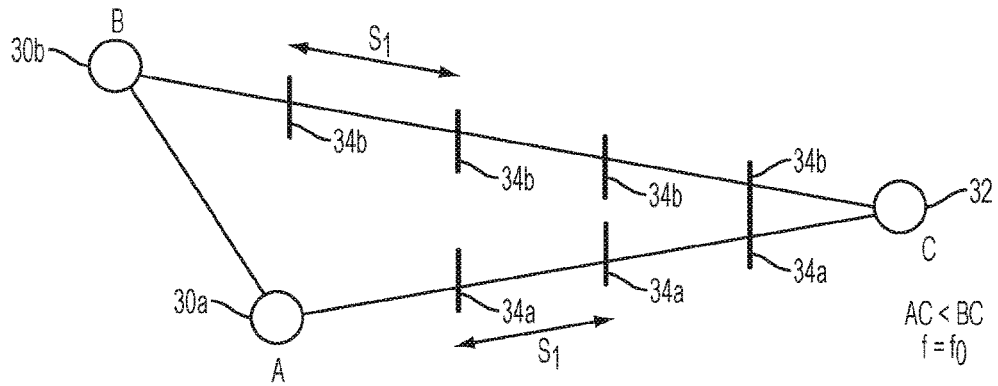
Figure 6A:
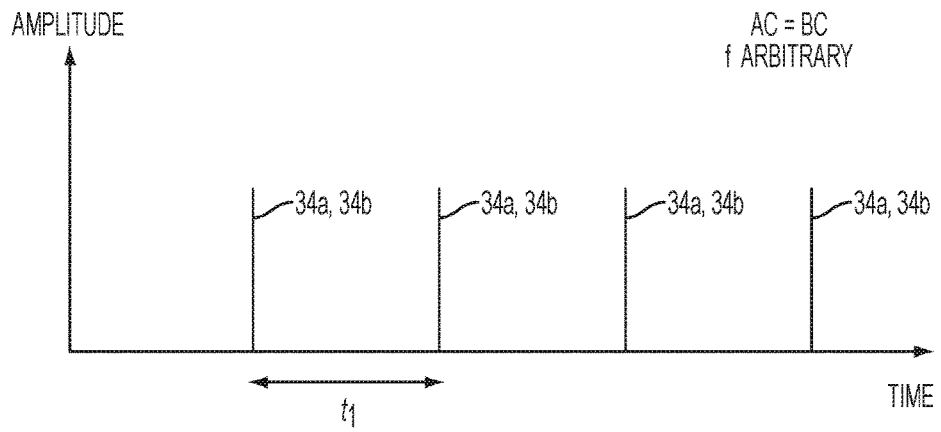
Figure 6B:
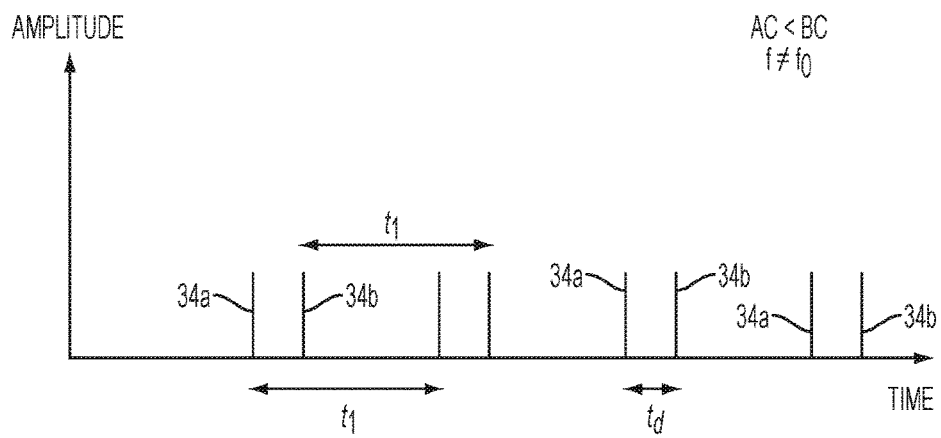
Figure 6C:
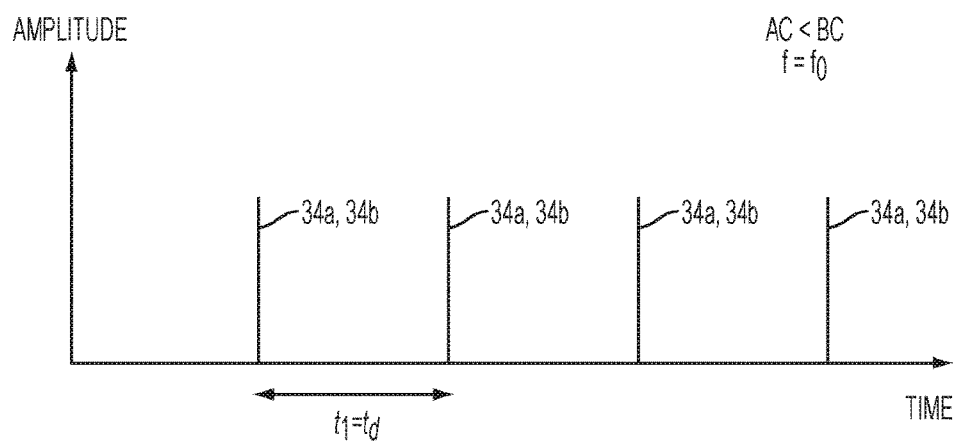
Figure 7A:
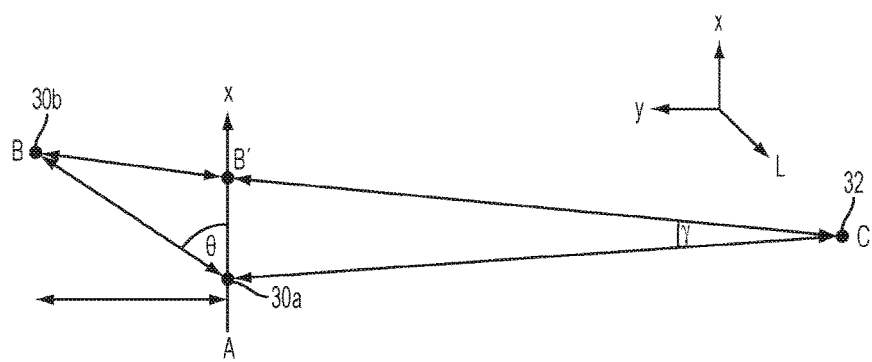
Figure 7B:
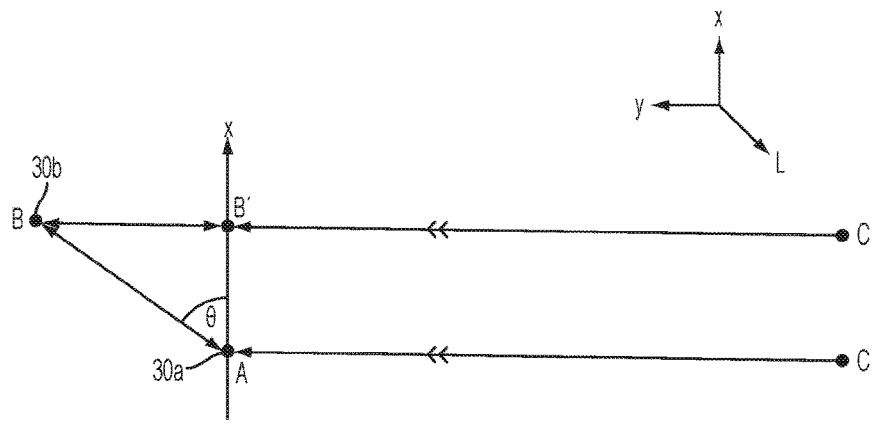
Figure 8A:
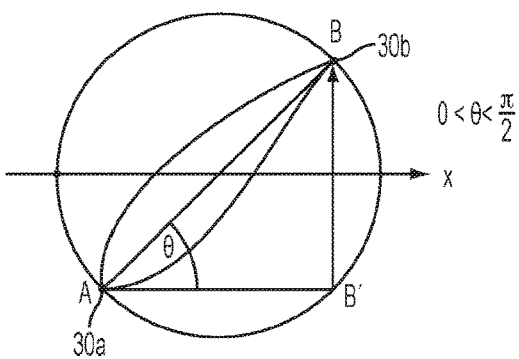
Figure 8B:
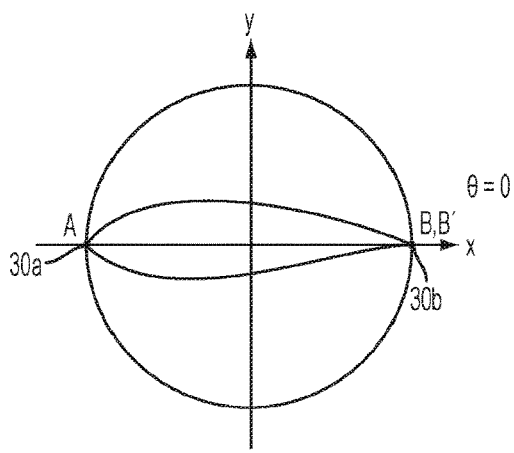
Figure 8C:
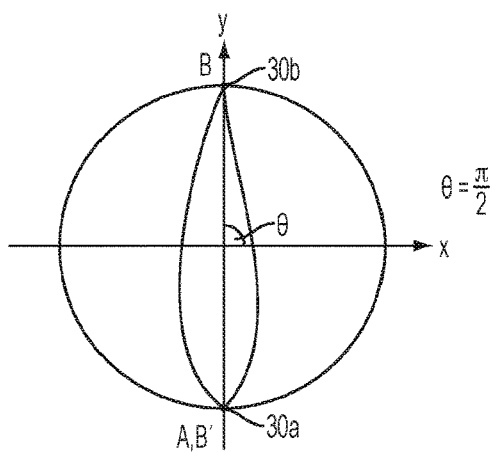

Embodiments of the invention will now be described by way of non-limiting example only with reference to the following figures, in which:

FIG. 3 is a perspective front view schematic illustration of a rotor-hub assembly as used in a horizontal axis wind turbine, configured in accordance with an embodiment of the invention;

FIG. 4 is a perspective side view schematic illustration of the rotor-hub assembly of FIG. 3;

FIGS. 5a, 5b and 5c show schematic illustrations of two optical transmitters that are located on a first blade of the rotor-hub assembly of FIGS. 3 and 4, and which emit blinks of light at a given frequency f that are subsequently received by an optical receiver that is located on a second blade of the rotor-hub assembly of FIGS. 3 and 4; FIG. 5a shows the case in which f=0 and f is arbitrary; FIG. 5b shows the case in which θ>0 and f takes a value such that the blinks of light from respective transmitters are not received by the receiver at substantially the same time; FIG. 5c shows the case in which θ>0 and f takes a value such that the blinks of light from respective transmitters are received by the receiver substantially simultaneously;

FIGS. 6a, 6b and 6c show schematic plots of the amplitude of the received blinks of light at the receiver shown in FIGS. 5a and 5b, the amplitude being plotted against time; FIG. 6a shows the case in which θ=0 and f is arbitrary; FIG. 6b shows the case in which θ>0 and f takes a value such that the blinks of light from respective transmitters are not received by the receiver at substantially the same time; FIG. 6c shows the case in which θ>0 and f takes a value such that the blinks of light from respective transmitters are received by the receiver substantially simultaneously;

FIGS. 7a and 7b are schematic illustrations showing how the two optical transmitters shown in FIGS. 5a and 5b are located at different distances from the optical receiver located on the second blade when the tip of the first blade shown in FIGS. 3 and 4 is rotated relative to the x-axis; FIG. 7b shows how the points ABB' form a right angled triangle when certain specific approximations are made; and FIGS. 8a, 8b and 8c illustrate the right angled triangle ABB' of FIG. 7b presented within a circle having a diameter equal to the physical distance of separation, denoted AB, of the two optical transmitters located on the first blade of FIG. 3 or 4, and illustrate how the blade twist angle is related to the distances AB and BB'; FIG. 8a illustrates the right angled triangle ABB' formed when the blade twist angle lies within the range 0<θ<π/2 radians; FIG. 8b shows the horizontal chord AB formed when the blade twist angle is 0 radians; and FIG. 8c shows the vertical chord AB formed when the blade twist angle is π/2 radians.

DETAILED DESCRIPTION

Figure 1:
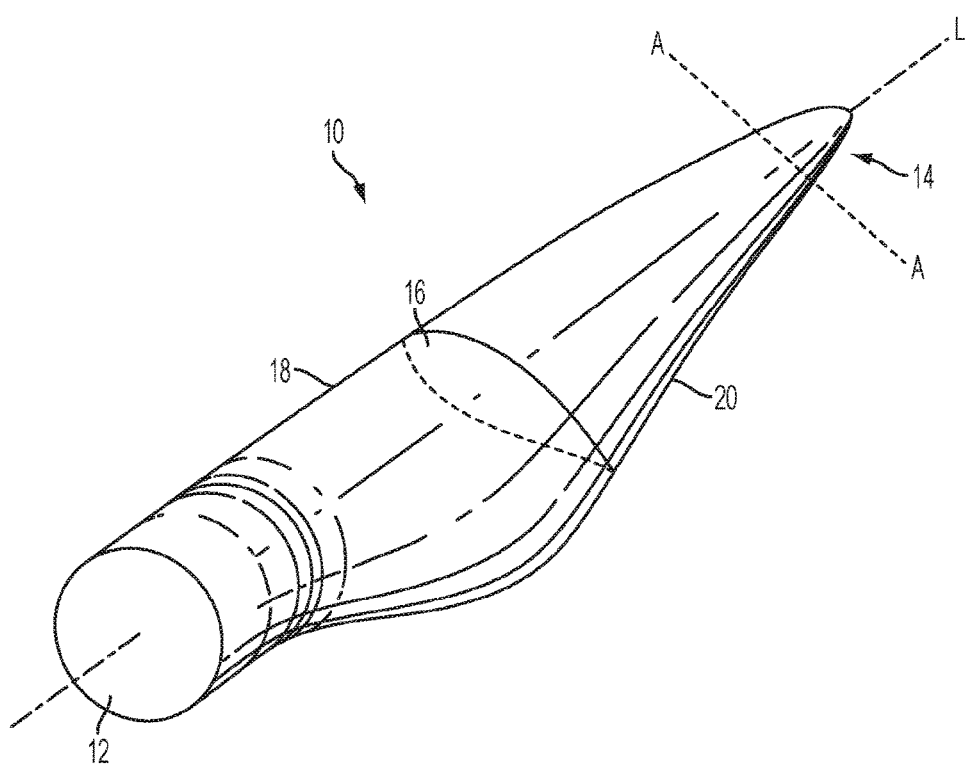
Figure 2A:
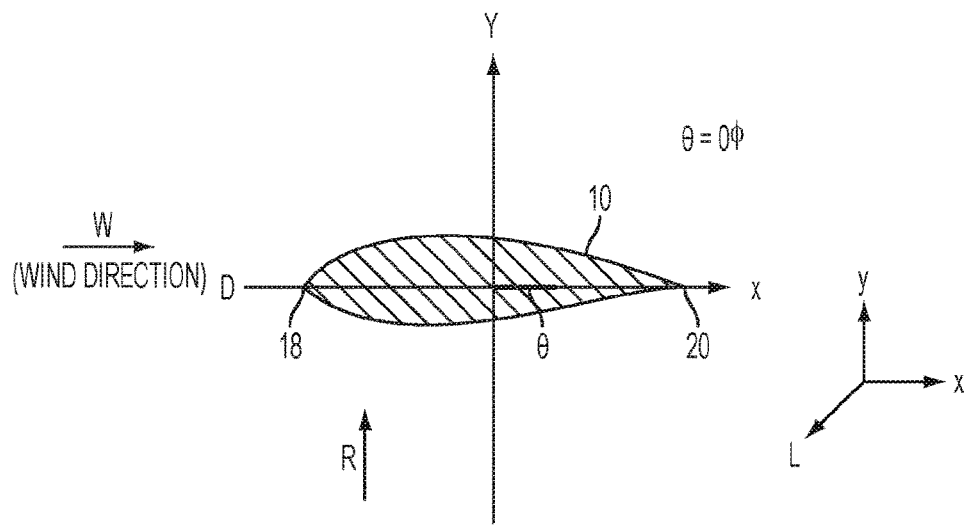
Figure 2B:
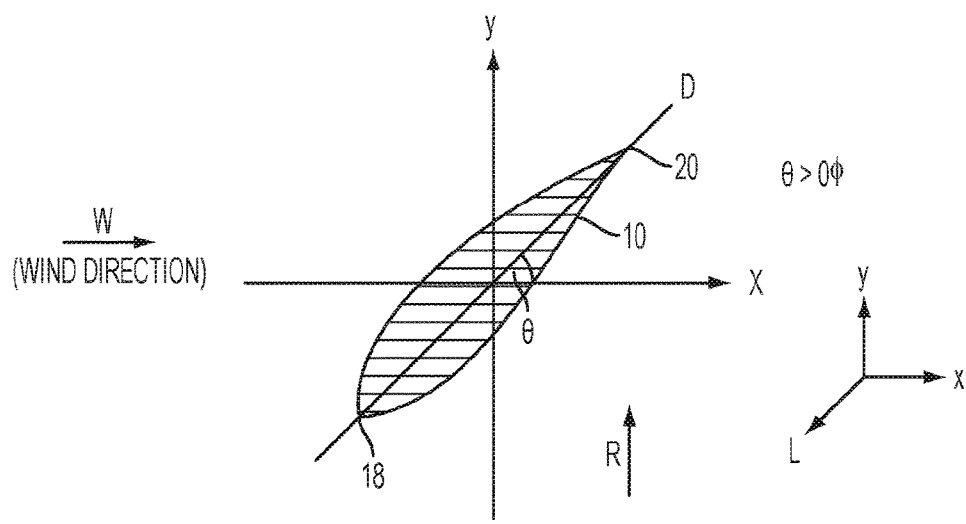

FIG. 3 schematically illustrates a rotor-hub assembly 22 as featured in a horizontal axis wind turbine. The illustrated rotor-hub assembly 22 comprises three turbine blades 24a, 24b, 24c affixed to a central hub 26 via a pitch mechanism (not illustrated). The blades 24a, 24b, 24c have a cross-sectional profile 16 as illustrated in FIG. 1, and are arranged to cause anti-clockwise rotation of the rotor-hub, as indicated by the directional arrows 28, when wind is incident on the blades 24a, 24b, 24c in a direction substantially perpendicular to and into the plane of the page.

FIG. 4 is a side perspective view of the rotor-hub assembly 22 of FIG. 3.

Each blade 24a, 24b, 24c of the rotor-hub assembly 22 is configured with at least two optical transmitters 30a, 30b (located at positions A and B, respectively), and at least one optical receiver 32 (located at position C). A first one of the optical transmitters 30a is arranged at the leading edge 18 of each blade 24a, 24b, 24c, and a second one of the optical transmitters 30b is arranged at the trailing edge 20. The first and second optical transmitters 30a, 30b are separated in a chord-wise direction D of each blade 24a, 24b, 24c, which is substantially perpendicular to the longitudinal axis L of each blade. The optical transmitters 30a, 30b are located substantially in the vicinity of the tip of each blade 24a, 24b, 24c, to enable accurate determination of the blade twist angle θ.

The at least two transmitters 30a, 30b located on a first blade 24a are each configured to emit blinks of light 34a, 34b (also referred to as blinking signals 34a, 34b) at substantially identical, known blinking frequencies, denoted f; that is, the period of time between each emitted blink of light is substantially equal for transmitters 30a and 30b. In addition, each blink of light from transmitter 30a is emitted at substantially the same time as each blink of light is emitted from transmitter 30b. The blinks of light 34a, 34b are subsequently received by receiver 32 located on a second adjacent blade 24b. The receiver 32 is configured to measure the amplitude of the received blinks of light 34a, 34b. Note that transmitters 30a, 30b located on second blade 24b emit blinks of light 34a, 34b that are received by receiver 32 on a third blade 24c, and that transmitters 30a, 30b located on the third blade 24c emit blinks of light 34a, 34b that are received by receiver 32 on the first blade 24a. The transmitters 30a, 30b are configured such that the frequency of the emitted blinks of light 34a, 34b may be controllably varied, as is discussed later.

The twist angle θ of the first blade 24a relative to the second blade 24b is calculated on the basis of the characteristics of the blinks of light 34a, 34b received by receiver 32 from transmitters 30a, 30b, as will now be explained in detail with reference to the remaining figures.

FIGS. 5a and 5b show schematic diagrams of transmitters 30a, 30b at positions A, B, that are emitting blinks of light 34a, 34b, respectively. As mentioned above, each blink of light 34a from transmitter 30a is emitted at substantially the same time as a corresponding blink of light 34b from transmitter 30b. In addition, blinks of light 34a, 34b are emitted from transmitters 30a, 30b, respectively, at constant time intervals $t_1$, which means that the distance between each blink of light 34a from transmitter 30a, and the distance between each blink of light 34b from transmitter 30b, is given by $s_1 = vt_1$, where v is the speed of light. Furthermore, the amplitudes of the transmitted blinks of light 34a, 34b are substantially equal.

FIGS. 5a and 5b also show that transmitters 30a, 30b are spaced apart by a distance that is denoted AB.

FIG. 5a shows the case of zero blade twisting, that is, when θ=0. In this case the arrangement of transmitters 30a, 30b and receiver 32 is configured such that the distance between transmitter 30a and receiver 32, denoted AC, is equal to the distance between transmitter 30b and receiver 32, denoted BC (i.e. AC=BC). This means that the respective blinks of light 34a, 34b that are emitted from transmitters 30a, 30b are received at receiver 32 substantially simultaneously for all values of the blinking frequency f.

FIG. 5b shows the case of non-zero blade twisting, that is, when θ>0. In this case the distance between transmitter 30a and receiver 32 is less than the distance between transmitter 30b and receiver 32 (i.e. AC<BC). This means that the respective blinks of light 34a, 34b that are emitted from transmitters 30a, 30b are no longer received at receiver 32 substantially simultaneously for all values of the blinking frequency f.

FIG. 5c also shows the case of non-zero blade twisting, θ>0; however, unlike in FIG. 5b, the blinking frequency f is equal to a so-called particular blinking frequency, denoted $f_0$, such that the blinks of light 34a, 34b are received at receiver 32 substantially simultaneously. This is discussed in greater detail below.

FIGS. 6a, 6b and 6c show schematic plots of the amplitude of the received signals at receiver 32 in the cases θ=0 for an arbitrary value of the blinking frequency f (illustrated in FIG. 5a), θ>0 with $f \neq f_0$ (illustrated in FIG. 5b), and θ=0 with $f = f_0$ (illustrated in FIG. 5c), respectively. In particular, FIG. 6a shows that when θ=0, two blinks of light (one from each transmitter 30a, 30b) arrive at receiver 32 substantially simultaneously such that these received signals overlap, and therefore register as a single peak when measured by receiver 32. The time interval between each peak, $t_1$, is equal to the time interval between each transmitted blink of light 34a, 34b from respective transmitters 30a, 30b (i.e. $t_1=1/f$).

In contrast, FIG. 6b shows that when θ>0 with f≠$f_0$, there is a time difference, denoted $t_d$, between the blinks of light 34a and 34b that are transmitted substantially simultaneously being received at receiver 32. This means that these received signals do not overlap, and therefore register as two separate peaks when measured by receiver 32. Note that the measured peaks in FIG. 6b therefore are substantially double in number, but half in amplitude, of those in FIG. 6a.

FIG. 6c shows that when θ>0 with f=$f_0$, two blinks of light (one from each transmitter 30a, 30b) arrive at receiver 32 substantially simultaneously such that these received signals overlap, and therefore register as a single peak when measured by receiver 32 (as in the case θ=0 shown in FIG. 6a).

In order that the twist angle θ may be determined, the difference in the distance from transmitter 30a to receiver 32 and from transmitter 30b to receiver 32, denoted $s_d$, is to be determined (where $s_d$=AC−BC). One method in which this could be achieved is by measuring the time, $t_d$, between blinks of light 34a, 34b from respective transmitters 30a, 30b, then using the relationship $s_d=vt_d$, where v is again taken to be the speed of light. This approach, however, would need advanced equipment designed to measure the time between respective received blinks of light 34a, 34b, which would be expensive and likely too fragile to be located on a wind turbine blade.

Instead, an alternative method that obviates the need for such equipment is described. In particular, the blinking frequency f (i.e. the time interval between each blink of light 34a from transmitter 30a and the time interval between each blink of light 34b from transmitter 30b) is varied by substantially the same amount for each transmitter 30a, 30b. This is turn means that the distance between each blink of light from a given transmitter, $s_1$, also varies.

Specifically, the blinking frequency f with which blinks of light 34a, 34b are emitted is varied until the distance between each blink of light from a given transmitter substantially equals the difference in distance from transmitter 30a to receiver 32 and from transmitter 30b to receiver 32, that is, until $s_1=s_d$. As mentioned above, the blinking frequency f at which this occurs is referred to as the particular frequency $f_0$ (and is illustrated in FIG. 5c).

When the blinking frequency takes a value such that $s_1=s_d$ (i.e. when f=$f_0$), and in the case when blade twisting results in transmitter 30b being further from receiver 32 than transmitter 30a is (i.e. when BC−AC>0 such that θ>0, as illustrated in the figures), a blink of light 34a from transmitter 30a and the blink of light 34b from transmitter 30b that was emitted immediately prior to said blink of light 34a are received at receiver 32 substantially simultaneously (i.e. as shown in FIG. 5c). This means that these two blinks of light 34a, 34b received at receiver 32 will register as a single peak of amplitude substantially double that which would be registered from a single blink of light (i.e. as shown in FIG. 6c). Therefore, in practice the frequency f of the emitted blinks of light 34a, 34b is varied until a received signal of amplitude substantially twice that of a single blink of light is obtained.

Note that this method may readily be adapted for the case when transmitter 30b is further from receiver 32 than transmitter 30a is (when AC>BC such that θ<0).

The twist angle θ may then be approximated as described below.

FIG. 7a is a schematic illustration showing how the distances from each transmitter 30a, 30b to receiver 32 are not equal (in particular, AC<BC) when first blade tip 24a is rotated relative to the x-axis. The positions A, B of transmitters 30a, 30b are illustrated with respect to the position C of receiver 32. The distance $s_d$=BC−AC is represented by the line segment BB'. As above, the real physical distance of separation between transmitters 30a, 30b is AB. The line segments AC and B'C are equal in length (i.e. AC=B'C). The distance BB' is the additional distance that second blink of light 34b emitted from second transmitter 30b travels to receiver 32 with respect to first blink of light 34a emitted from first transmitter 30a. When the distance BB' is equal to the distance between each respective blink of light 34a, 34b emitted from transmitters 30a, 30ba, a single peak of amplitude substantially twice that which a single blink of light generates is registered at receiver 32.

With reference to the triangle AB'C, since the distances AC and B'C are significantly greater than the distance AB, a reasonable approximation is to assume that AC and B'C are substantially parallel in orientation. This is because the angle γ formed between AC and B'C is significantly smaller than the angles formed between both B'C and B'A, and AB' and AC. FIG. 7b illustrates AC and B'C being substantially parallel in orientation. On the basis of this assumption, the triangle ABB' is a right-angled triangle having an angle of divergence from the x-axis of θ.

FIGS. 8a, 8b, and 8c illustrate the right-angled triangle ABB' plotted on a circle having a diameter equal to the line AB (i.e. the diameter is equal to the physical distance of separation between transmitters 30a, 30b), for different values of the twist angle θ. The physical distance of separation AB between the optical transmitters in the chordwise direction along a blade 24a, 24b, 24c is constant, and is accurately measured when the transmitters are installed on the blade (i.e. AB is a known value).

The distance BB' is determined empirically using transmitters 30a, 30b and receiver 32, by analysing the characteristics of the signals measured at receiver 32. In the first embodiment, the first blade 24a is arranged relative to the second blade 24b such that 0<θ<π/2 (as illustrated in FIG. 8a). The frequency f with which blinks of light 34a, 34b are emitted is then varied by a known amount. Varying the frequency f causes the distance between successive blinks of light from a given receiver to vary. For example, the frequency f may be varied from a first known frequency to a second known frequency different to the first frequency. Assuming that the distance BB' remains substantially constant (i.e. that the twist angle θ remains substantially constant) as the frequency is varied, then BB' is substantially equal to the distance between successive blinks of light from a given transmitter 30a, 30b when a blink of light 34a emitted from transmitter 30a and the blink of light 34b from transmitter 34b that is emitted directly after said blink of light 34a registers as a single peak at receiver 32, as described above. This is illustrated in further detail in the below example, provided for illustrative purposes only.

When θ>0, the particular frequency $f_0$ at which respective blinks of light 34a, 34b emitted from transmitters 30a, 30b will overlap at receiver 32 may be determined by controllably varying f, as described above. The distance BB' may then be determined using the relationship $$BB' = \frac{v}{f_0}.$$

FIG. 8a illustrates the case in which the twist angle θ lies in the interval 0<θ<π/2. Given that the distance AB is known a priori, and the distance BB' has been determined using the above-described method, then simple trigonometry may be used to obtain the twist angle θ, namely $$\theta = \sin^{-1}\left(\frac{BB'}{AB}\right).$$

In practice, the twist angle θ is likely to be restricted to within the interval 0≤θ≤π/2. This gives rise to the possibility of two extreme cases, namely θ=0 and θ=π/2, as illustrated respectively in FIGS. 8b and 8c.

FIG. 8b illustrates that in the case θ=0, the distance BB' is zero, so that transmitters 30a, 30b are equidistant from receiver 32. FIG. 8c illustrates that in the case θ=π/2, the distance BB' is equal to the physical distance of separation of transmitters 30a, 30b, namely AB.

If, for example, the overlap frequency is found to be $f_0$=1 Gigahertz (and using the approximation v=$3\times10^8$ meters per second), then the distance BB' is 0.3 meters. Then if, for example, the distance between transmitters 30a, 30b is 0.4 meters (i.e. AB=0.3), the twist angle is approximated to be θ≅0.85 radians.

In summary, the distance BB' is determined by controllably varying the frequency of emitted blinks of light by transmitters 30a, 30b and observing the amplitude of the received signals at the receiver 32. The frequency is varied until the receiver 32 detects blinks of increased amplitude, e.g. double the amplitude in this example. This occurs when the physical separation between successive blinks matches the optical path difference (BB') between the respective transmitters 30a, 30b and the receiver 32 so that the receiver 32 receives blinks from both transmitters 30a 30b substantially simultaneously. The frequency $f_0$ at which this occurs is then used to calculate the distance BB'.

In this example, the transmitters 30a, 30b may be configured to transmit blinks of light in the interval 0.5-2 Gigahertz. Alternatively, transmitters 30a, 30b may be configured to transmit blinks of light 34a, 34b in a different interval of frequencies. Once the distance BB' has been determined, then the blade twist angle θ may be approximated as described above.

In use, transmitters 30a, 30b may be configured to continuously emit blinks of light 34a, 34b in order to measure the twist angle θ continuously; or alternatively, transmitters 30a, 30b may be activated when precise blade tip measurement is required.

In order to avoid electrically conducting material present within blades 24a, 24b, 24c, optical fibres are used to transmit optical signals from a source located inside the hub to transmitters 30a, 30b located substantially in the vicinity of the blade tips.

The herein described embodiments may be used in pitch control strategies and/or to control stress loads on the blade.

It is to be appreciated that the above method for determining the blade twist angle θ is valid for right-angled triangles. Use of these equations provides a reasonable approximation of the value of θ in cases where the triangle ABB' may reasonably be approximated as a right-angled triangle. This approximation does not introduce excessive errors in the calculated value of θ when the distance of separation between the two adjacent turbine blades 24a, 24b is much larger than the physical distance of separation between transmitters 30a, 30b positioned at A, B, respectively. In practice, as can be seen from FIG. 6a, the triangle ABB' is not a right-angled triangle.

The present method may still be used to determine the twist angle even where the above approximation is not valid. In such circumstances, known trigonometric relationships applicable to non-right-angled triangles may be used. For example, any one or more of the law of sines, the law of cosines, the law of tangents and the law of cotangents may be used to determine the blade twist angle, or any other known trigonometric equation valid for non-right angled triangles. Since the aforementioned trigonometric laws are well known in the art, it is unnecessary to provide a detailed discussion thereof here.

In different embodiments, the distances AC and BC need not be equal when θ=0.

The present embodiment describes an arrangement with two optical transmitters and one optical receiver on each wind turbine blade; however, each blade may comprise greater or fewer transmitters and/or receivers according to need. For example, FIG. 3 illustrates the first blade 24a comprising two pairs of optical transmitters 30a, 30b and 44a, 44b. The second pair of optical transmitters 44a, 44b is located at a different position along the longitudinal axis L of the first blade 24a, with respect to the first pair of optical transmitters 30a, 30b. This configuration of optical transmitters enables the degree of twist of the first blade 24a to be determined at different longitudinal positions. This is advantageous when the pitch of the first blade 24a varies along its longitudinal axis L, which may occur when the first blade 24a is subject to high stresses. In turn, each blade 24a, 24b, 24c may be provided with a plurality of different optical receivers, each different receiver being arranged to measure the transmitted signals generated by a different pair of optical transmitters.

The term 'twist angle' may refer to the angle of the blade at any point along the blade's longitudinal axis L, and not be restricted to the angle in the vicinity of the blade tip.

In different embodiments, transmitters 30a, 30b may not emit signals in the form of blinks of light, and instead emit electromagnetic signals from a different part of the spectrum. The receiver 32 may then be configured to receive the type of signals emitted by the transmitters.

The strength of the blinks of light from different transmitters need not be substantially equal, and may be of any strength.

The angle between each transmitter and each receiver will depend on, for example, the number of blades attached to the wind turbine and the position of the transmitters and receivers on respective blades. These variations will be known in each individual case and may easily be incorporated into the above-described method by the skilled person.

Rather than an arrangement comprising a pair of transmitters transmitting blinking signals to a single receiver, the arrangement may be modified to include a single transmitter transmitting blinking signals in two different directions towards two receivers. The above-described method may be used in a similar way to determine the blade twist angle using the received signals at the two receivers.

The present method may be used to calculate blade twist angle for a wind turbine comprising any number of turbine blades. Whilst the herein described embodiments relate to a wind turbine comprising three blades, this is non-limiting for illustrative purposes only.

In addition to determining the blade twist angle, it may also be desirable to determine the degree to which the blade is bending, especially near the blade tip. Such information may also be taken into account when determining the blade twist angle, and is particularly useful in cases where the degree of bending differs between blades at a given time.

The embodiment described herein are provided for illustrative purposes only and are not to be construed as limiting the scope of the invention, which is defined in the following claims.

The invention claimed is:

1. A method of determining a twist angle of a wind turbine blade, the method comprising:
    providing first and second transmitters on the wind turbine blade, the first transmitter being spaced apart from a receiver by a first distance, and the second transmitter being spaced apart from the receiver by a second distance, the transmitters being arranged such that twisting of the blade causes an increase in one of the first or second distances and a decrease in the other of the first or second distances;
    transmitting a blinking signal from each of the first and second transmitters towards the receiver, the blinking signals having a blinking frequency;
    varying the blinking frequency of the blinking signals;
    monitoring the amplitude of the blinking signal received by the receiver as the blinking frequency is varied;
    determining a particular blinking frequency that results in an increased amplitude of the blinking signal received by the receiver; and
    using the determined particular blinking frequency to calculate the blade twist angle.

2. A method according to claim 1, wherein the first and second transmitters are mutually spaced apart in a chordwise direction of the wind turbine blade.

3. A method according to claim 1, wherein the first transmitter is located at or near a leading edge of the wind turbine blade and the second transmitter is located at or near a trailing edge of the wind turbine blade.

4. A method according to claim 1, wherein the first and second transmitters are located near the tip of the wind turbine blade.

5. A method according to claim 1, comprising calculating the difference between the first distance and the second distance using the determined particular blinking frequency and calculating the blade twist angle using the calculated difference between the first distance and the second distance.

6. A method according to claim 1, wherein the blinking signals from the first and second transmitters are transmitted substantially simultaneously.

7. A method according to claim 1, wherein the amplitudes of the blinking signals from the first and second transmitters are substantially identical, and transmitting the blinking signals at the particular frequency results in the amplitude of the received signal at the receiver being approximately twice the amplitude of the transmitted blinking signals.

8. A method according to claim 1, comprising providing the receiver on a second blade of the wind turbine.

9. A method according to claim 8, wherein the receiver is located near the tip of the second wind turbine blade.

10. A method according to claim 1, comprising providing a plurality of first transmitters and a plurality of second transmitters on the wind turbine blade, the first transmitters being mutually spaced along the length of at least part of the wind turbine blade and the second transmitters being mutually spaced along the length of at least part of the wind turbine blade.

11. A method according to claim 8, comprising providing a plurality of receivers on the second wind turbine blade, the receivers being mutually spaced along the length of at least part of the second wind turbine blade.

12. A method according to claim 1, comprising communicating blinking signals from a remotely-located source to the first and second transmitters via a first optical fibre extending longitudinally along the wind turbine blade, and communicating the received blinking signals to a remotely-located detector via a second optical fibre extending longitudinally along the wind turbine blade.

13. A system for determining a blade twist angle of a wind turbine blade, the system comprising:
    first and second transmitters on the wind turbine blade each configured to transmit a blinking signal having a blinking frequency;
    a receiver configured to receive the blinking signals;
    a controller configured to vary the blinking frequency of the blinking signals;
    a processor configured to monitor an amplitude of the blinking signal received by the receiver as the blinking frequency is varied, to determine a particular blinking frequency that results in an increased amplitude of the blinking signal received by the receiver, and to calculate the blade twist angle using the determined particular blinking frequency,
    wherein the first transmitter is spaced apart from the receiver by a first distance and the second transmitter is spaced apart from the receiver by a second distance, and the transmitters are arranged such that twisting of the blade causes an increase in one of the first or second distances and a decrease in the other of the first or second distances.

14. A system according to claim 13, wherein the receiver is located on a second wind turbine blade.

15. A wind turbine, comprising:
    a tower;
    a nacelle disposed on the tower;
    a rotatable shaft at least partially disposed in the nacelle and having a rotor disposed on one end thereof;
    a plurality of blades disposed on the rotor; and
    a system for determining a blade twist angle of at least one wind turbine blade of the plurality of blades, the system comprising:
        first and second transmitters on the wind turbine blade each configured to transmit a blinking signal having a blinking frequency;
        a receiver configured to receive the blinking signals;
        a controller configured to vary the blinking frequency of the blinking signals;
        a processor configured to monitor an amplitude of the blinking signal received by the receiver as the blinking frequency is varied, to determine a particular blinking frequency that results in an increased amplitude of the blinking signal received by the receiver, and to calculate the blade twist angle using the determined particular blinking frequency,
        wherein the first transmitter is spaced apart from the receiver by a first distance and the second transmitter is spaced apart from the receiver by a second distance, and the transmitters are arranged such that twisting of the blade causes an increase in one of the first or second distances and a decrease in the other of the first or second distances.

* * * * *